United States Patent [19]

Speece

[11] Patent Number: 5,177,862
[45] Date of Patent: Jan. 12, 1993

[54] AUTOMATIC ASSEMBLY SYSTEM

[75] Inventor: James R. Speece, Milton, Wis.

[73] Assignee: Giddings & Lewis, Inc., Fond du Lac, Wis.

[21] Appl. No.: 610,376

[22] Filed: Nov. 6, 1990

[51] Int. Cl.$^5$ .............................................. B23P 19/04
[52] U.S. Cl. ...................................... 29/824; 29/430; 29/783; 29/793
[58] Field of Search ................. 29/429, 430, 469, 779, 29/783, 791, 793, 794, 822, 823, 824; 198/465.1, 465.2, 465.3, 803.01, 803.2

[56] References Cited

U.S. PATENT DOCUMENTS

| | | | |
|---|---|---|---|
| 3,141,375 | 7/1964 | Randall | 29/824 X |
| 4,033,033 | 7/1977 | Heffner | 29/824 |
| 4,667,866 | 5/1987 | Tobita et al. | 29/824 X |
| 4,734,979 | 4/1988 | Sakamoto et al. | 29/824 X |
| 5,027,502 | 7/1991 | Sakamoto et al. | 29/791 X |

FOREIGN PATENT DOCUMENTS

| | | | |
|---|---|---|---|
| 166172 | 7/1987 | Japan | 29/824 |
| 229784 | 9/1989 | Japan | 29/824 |

*Primary Examiner*—Joseph M. Gorski
*Assistant Examiner*—Peter D. Vo
*Attorney, Agent, or Firm*—Donald Cayen

[57] ABSTRACT

An automatic assembly system transports workpieces to a work station whereat the workpieces are processed into an assembled product. The automatic assembly system conmprises a monorail that defines a path above the work station. A trolley travels along the monorail supporting a workpiece carrier by means of a pair of latches pivotally connected to the trolley. A lowerator mechanism is mounted to the monorail above the work station. When a trolley stops above the work station, the lowerator mechanism thereat operates to lift the workpiece carrier from the trolly latches. The trolley latches retract and the lower mechanism then lowers the carrier and workpieces to the workstation without lowering the trolley or the monorail. A safety interlock prevents uncontrolled lowering of the carrier and workpieces. Tooling trays suitable for holding different sets of workpieces index in directions parallel to the monorail path to bring to the work station the tooling tray required for the particular workpiece being lowered to and processed at the work station.

17 Claims, 12 Drawing Sheets

AUTOMATIC ASSEMBLY SYSTEM

BACKGROUND OF THE INVENTION

1. Field of the Invention

This invention pertains to flexible manufacturing systems, and more particularly to apparatus for processing selected workpieces into an assembled product.

2. Description of the Prior Art

Various equipment has been developed to transport individual components to a work station where selected operations are performed on them. For example, it is known to weld two or more pieces of preformed sheet metal into a sturdy automobile bodyside in an automatic assembly machine. The sheet metal workpieces are clamped into accurate relation to each other at a work station of the automatic assembly machine, and the workpieces are then welded together by robots or other processing equipment.

Transporting individual workpieces to and accurately locating them at a work station on a production basis presents several difficult problems. The clamps and other tooling at the work station present obstacles that must be avoided by the incoming and departing workpieces. The workpieces must be accurately positioned within the work station so that the tooling can properly clamp them together and the robot or other processing equipment can correctly perform the necessary operations. In addition, high production rates and reliability over a long service life are critical.

In some assembly applications, workpieces best approach the work stations from above. Accordingly, prior equipment has been developed that transports workpieces along an overhead monorail. Trolleys traveling on the monorail have electric motors that are powered via sliding contacts from electrical wiring carried on the monorail. The trolleys travel in a downstream direction above the various work stations an support the workpieces at a height sufficient to clear all the tooling at the work stations. To perform an operation on a workpiece, the trolley transporting it stops at a rail section located directly over the appropriate work station. A mechanism operates to lower the rail section and trolley such that the workpiece is properly positioned within the tooling at the work station. When the particular operation has been completed, the rail section, trolley, and workpiece are raised such that the lowerable rail section is again in line with the adjacent fixed upstream and downstream rail sections. Then the trolley is controlled to transport the workpiece downstream to be over the next work station, and the cycle is repeated.

Although the prior monorail systems have enjoyed some success, they nevertheless have important disadvantages. A primary drawback is that joints in the electrical conductors that power the trolleys must be provided between the lowerable rail sections and the adjacent fixed upstream and downstream rail sections. It is very difficult to consistently and reliably return the conductors of a lowered rail section into exact alignment with the corresponding wires of the adjacent fixed rail sections. Consequently, the conductors of a lowerable rail section occasionally mismatch with the corresponding conductors of the adjacent fixed rail sections, which results in faulty and unreliable system operation. In addition, great care must be exercised to be certain that a trolley and workpiece upstream of a lowered rail section do not travel downstream and fall off the adjacent upstream rail section on top of the lowered rail section.

A further disadvantage of prior monorail systems is that the relatively great weight of the lowerable rail section, trolley, and workpiece requires that the lowering and raising motions be performed at relatively slow speeds. As a result, cycle times are undesirably long, and productivity is correspondingly low.

It is known in prior monorail assembly systems to provide tooling for more than one product proximate a work station and to index the desired tooling to the work station as required. However, the prior systems are designed such that the tooling indexes in a direction transverse to the direction of motion of the workpieces to and from the work station. That design necessitates that the robots or other equipment be mounted on a structure that is tiltable on the factory floor to enable the robots to approach, process, and retract from the workpieces at the work station. Such construction is very expensive, and it limits accessibility to the tooling and processing equipment for maintenance and alterations.

Thus, a need exists for improvements in assembly machine workpiece handling systems.

SUMMARY OF THE INVENTION

In accordance with the present invention, a versatile automatic assembly system is provided that reliably and efficiently transports workpieces to various work stations. This is accomplished by apparatus that includes workpiece carrying trolleys that travel along a path between work stations supplied with tooling from tooling trays that have in-line transfer capabilities.

The work stations may be configured along almost any path that suits the operations to be performed on the particular workpieces. A monorail suspended from a sturdy framework is located vertically above the work stations. The monorail defines the path through and above the work stations. The trolleys travel along the monorail under power picked up by sliders in contact with electrical conductors mounted to the monorail.

Each trolley supports a workpiece carrier. The carrier has a pair of vertical posts spaced in the direction of the monorail path. To the lower ends of the carrier posts is fixed a generally horizontal platform. The platform is provided with a series of fingers or antlers that support the workpieces in a manner best suited to the particular workpieces, the tooling at the work stations, and the operations to be performed on the workpieces at the work stations. For example, the carrier platform and fingers may be designed to hold two or more workpieces that are welded into an assembled product as they are transported through the various work stations.

The upper ends of the carrier posts are joined by an upper horizontal member. Spaced above and tied to the upper horizontal member is a longitudinally extending upper support beam.

To support a carrier on its trolley, the trolley is equipped with a pair of latches. In an extended position, the latches underlie the carrier upper support beam near its opposite ends to support the carrier against gravity. With the carrier supported by the trolley latches, the carrier travels along the monorail in unitary association with its trolley.

The trolleys are driven independently of each other. They are controlled to stop at locations such that their respective carriers and workpieces are located directly above the various work stations. A lowerator mechanism is mounted to the framework above each work station. Each lowerator mechanism includes a pair of support rollers mounted in respective slides. The rollers underlie the upper support beam of the carrier stopped at the work station. The slides are vertically movable by any suitable means, such as rack and pinion drives. Preferably, the slides are moved by associated first power actuators and chains. When a trolley has stopped above a work station, the first power actuators are actuated to raise the slides to cause the support rollers to contact the carrier upper support beam and lift the carrier a short distance off the trolley latches. Then second actuators of the lowerator mechanism pivot the latches from under the carrier upper support beam. The first actuators then operate to lower the carrier without any movement of the monorail or the trolley until the workpieces on the carrier platform come to rest on the tooling at the work station. To assure proper transfer of the workpieces from the carrier to the work station tooling, the carrier is lowered by the slides an additional short distance after the weight of the workpieces has been transferred to the tooling. The carrier remains within the work station while the workpieces undergo the operations performed there.

It is a feature of the present invention that the carrier platform and the workpieces supported thereon need not be positioned with great accuracy as they descend to a work station. Rather, it is preferred that the workpieces be free to float horizontally in a controlled manner so as to be within approximately 0.50 inches of their final required position as they approach the work station tooling. The workpieces are positioned into their final locations at the work station by suitable guides and blocks that form a part of the work station tooling, as is known in the art. To enable the workpieces to float to their final locations, rollers on the carrier are guided loosely through controlled gaps along vertical plates mounted to the trolley. As the carrier descends, it can float in the gaps between the carrier rollers and the trolley plates.

An outstanding advantage of the automatic assembly system of the present invention is that the trolleys need not operate simultaneously. One or more non working queue stations may be installed along the monorail path between the various work stations. In that manner, a work station can be inoperative for maintenance purposes without affecting operations at the other work stations, and trolleys can bank up at the queue stations upstream of the inoperative work station.

Further in accordance with the present invention, the tooling trays at the various work stations are designed with in-line transfer capabilities. In-line transfer of the tooling trays is achieved by indexing them in directions parallel to the monorail path. Each tooling tray is equipped with tooling that is specific to the workpieces of a particular product to be assembled at the work station. The tooling trays are constructed into a common fixture that is controlled to index to the work station the tooling tray that is appropriate for the particular workpieces supported by the trolley stopped above the work station. In that manner, different sets of workpieces can be transported by the trolleys to the same work station for being processed there. Further, the processing equipment, such as welding robots, can be permanently secured to the factory foundation, which greatly simplifies maintenance and alterations both to the tooling trays and to the processing equipment.

Other advantages, benefits, and features of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

GENERAL

Figure 1:
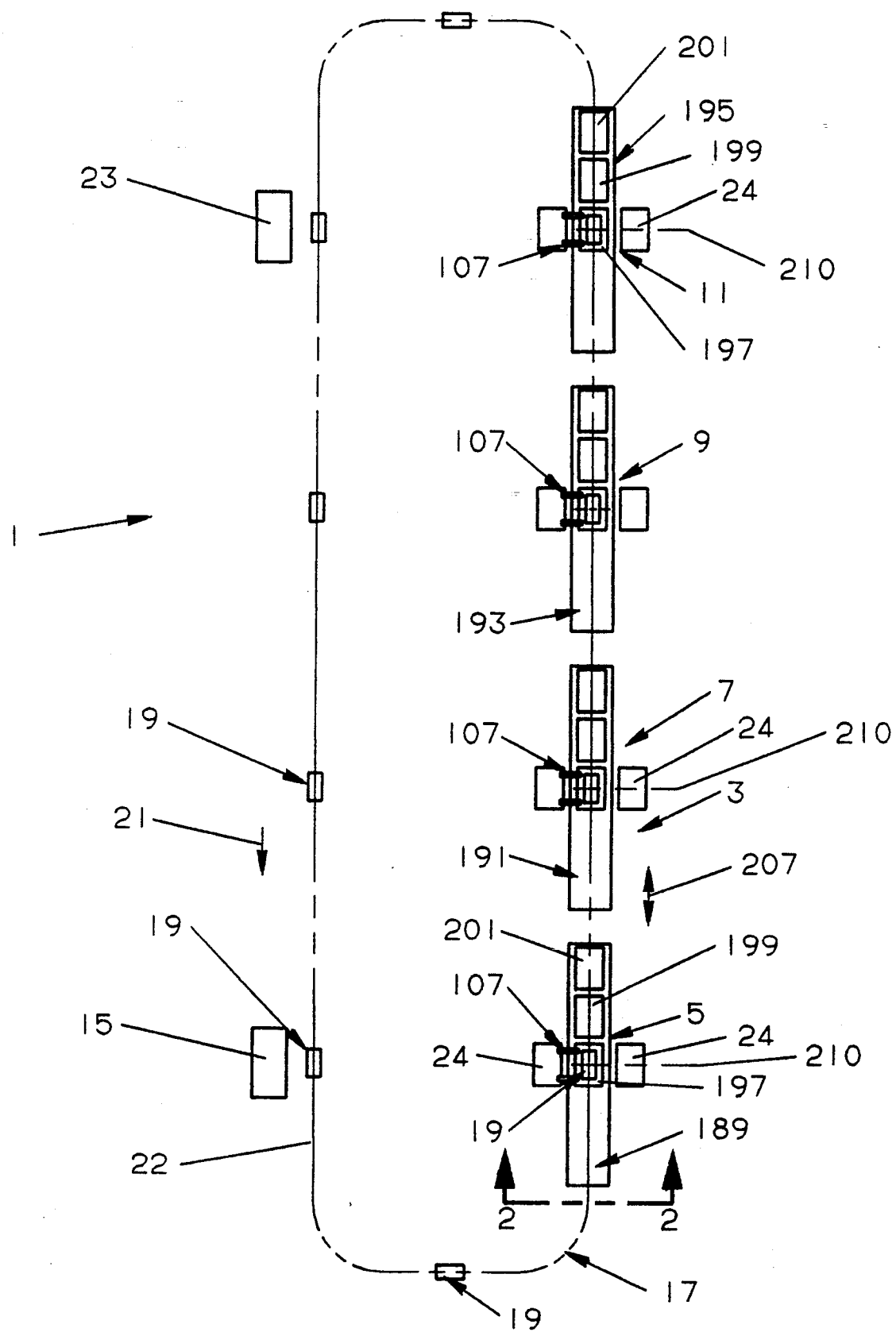
FIG. 1 is a schematic diagram of an automatic assembly system according to the present invention.

Referring to FIG. 1, a manufacturing system 1 is illustrated that includes the present invention. The manufacturing system 1 may be any of numerous types in which workpieces are brought to one or more work stations for having specific operations performed on the workpieces. For example, the manufacturing system 1 may be an automatic assembly system 3 that joins a number of individual components into an assembled product.

Figure 10:
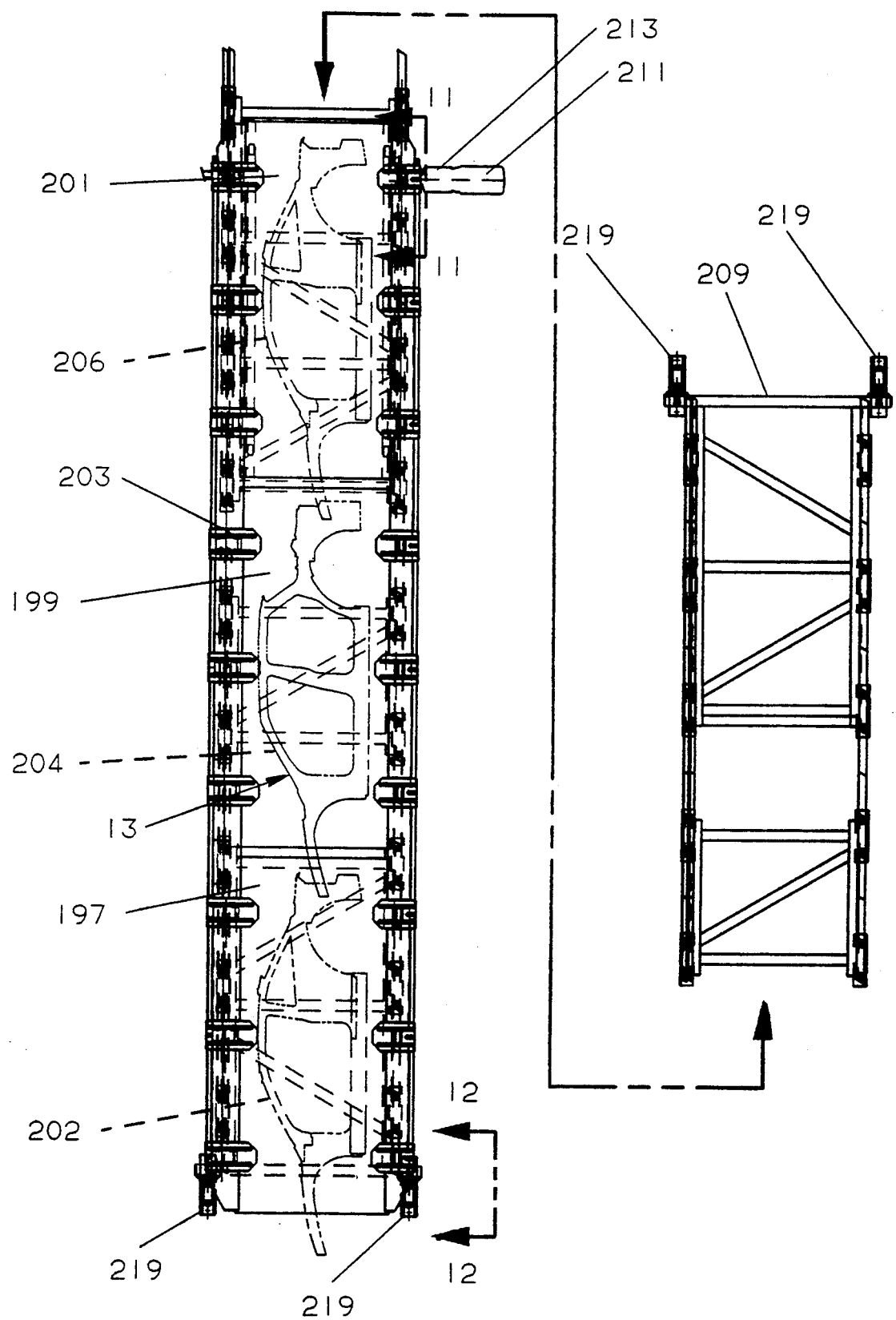
FIG. 10 is a view taken along lines 10—10 of FIG. 2.
Figure 11:
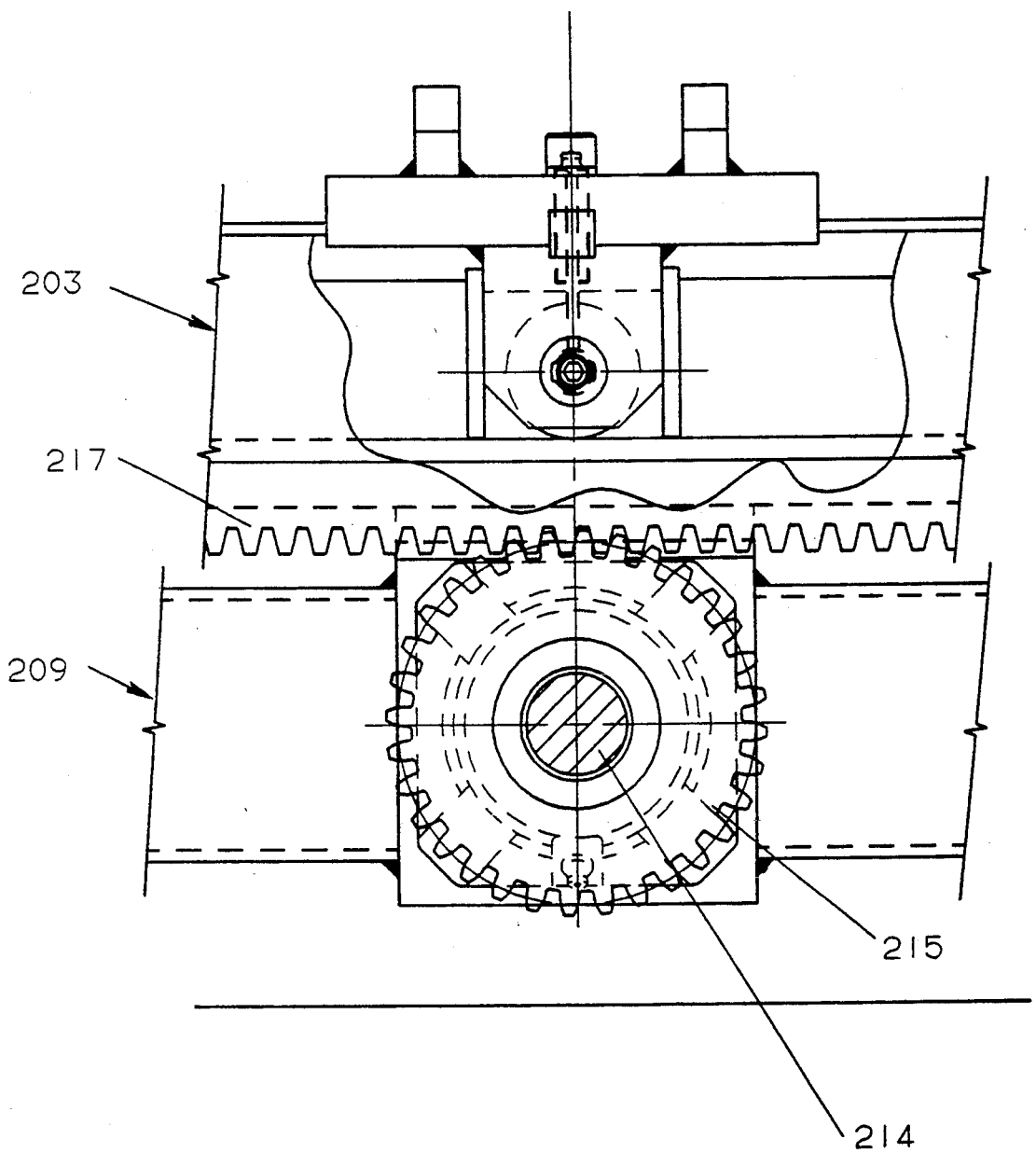
FIG. 11 is a broken cross sectional view taken along lines 11—11 of FIG. 10 and rotated 90 degrees clockwise.
Figure 12:
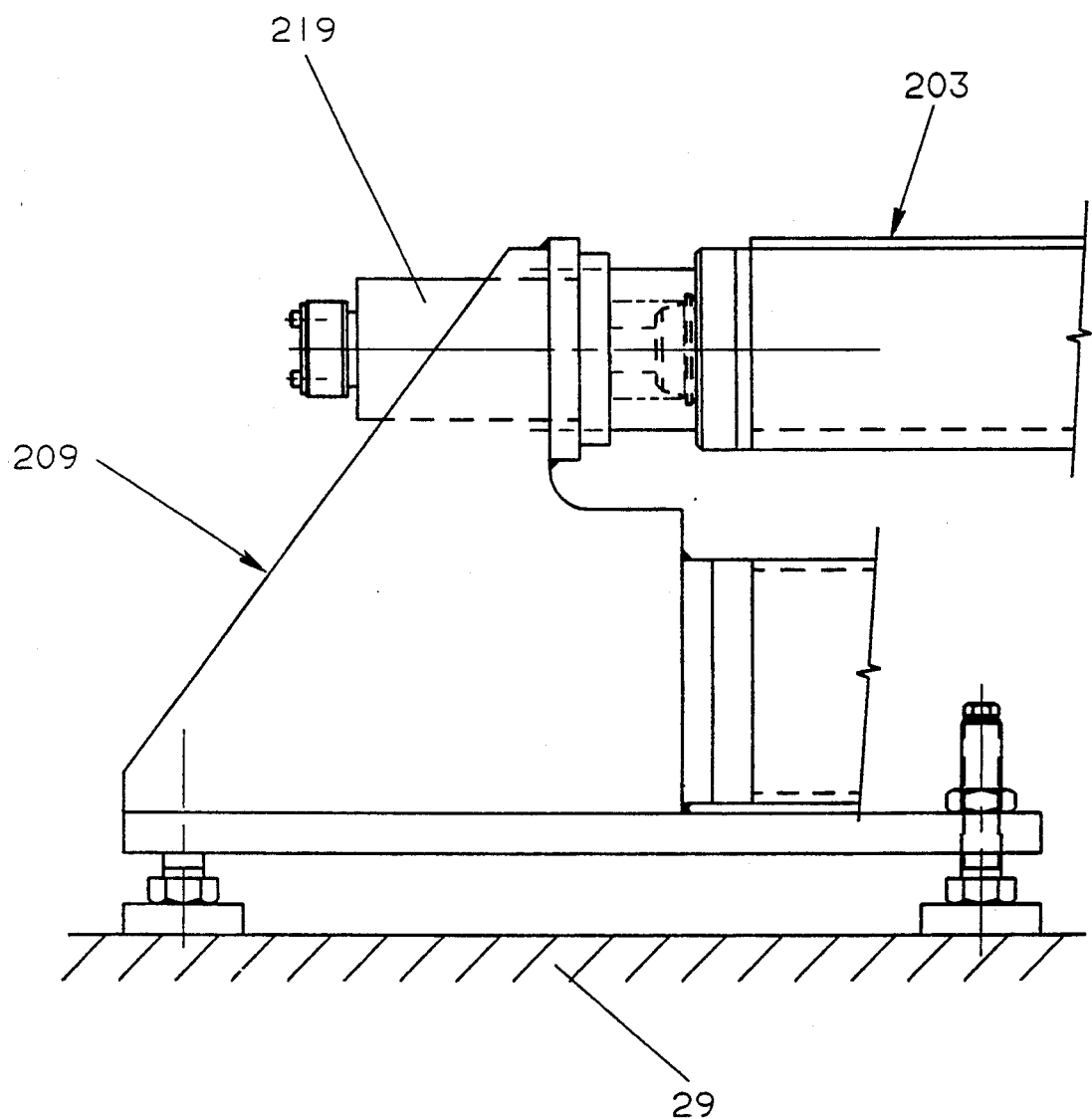
FIG. 12 is a view taken along lines 12—12 of FIG. 10 and rotated 90 degrees clockwise.

In the particular automatic assembly system 3 shown, four work stations, 5, 7, 9, and 11 are generally aligned end-to-end to assemble workpieces 13 into automobile bodysides 202, 204, and 206. Also see FIGS. 2 and 10. However, it will be understood that the automatic assembly system may have any number of work stations, and it may be of any configuration and size that suits the particular products that are to be assembled.

The workpieces 13 to be assembled at the work stations 5, 7, 9, and 11 are loaded at a loading station 15 onto an automatic monorail system 17. The automatic monorail system 17 includes a number of trolleys 19 that travel in the downstream direction of arrow 21 along a closed path 22. The path 22 is defined by an overhead monorail 25 that extends between and above the work stations. The automatic monorail system is controlled to advance the trolleys 19 and the workpieces carried thereon sequentially from the loading station 15 to the work stations. At each work station, processing equipment 24 performs specific operations on the workpieces. For example, the individual workpieces 13 may be welded by welding robots 24 into a unitary automobile bodyside 202, 204, or 206. The bodyside is completed when it leaves work station 11, and it is removed from the automatic monorail system 17 at an unloading station 23. In that manner, the automatic assembly system 3 operates on a continuous basis, and a trolley 19 unloaded at the unloading station 23 is reloaded at the loading station 15 and subsequently travels to the work stations.

MONORAIL

Figure 2:
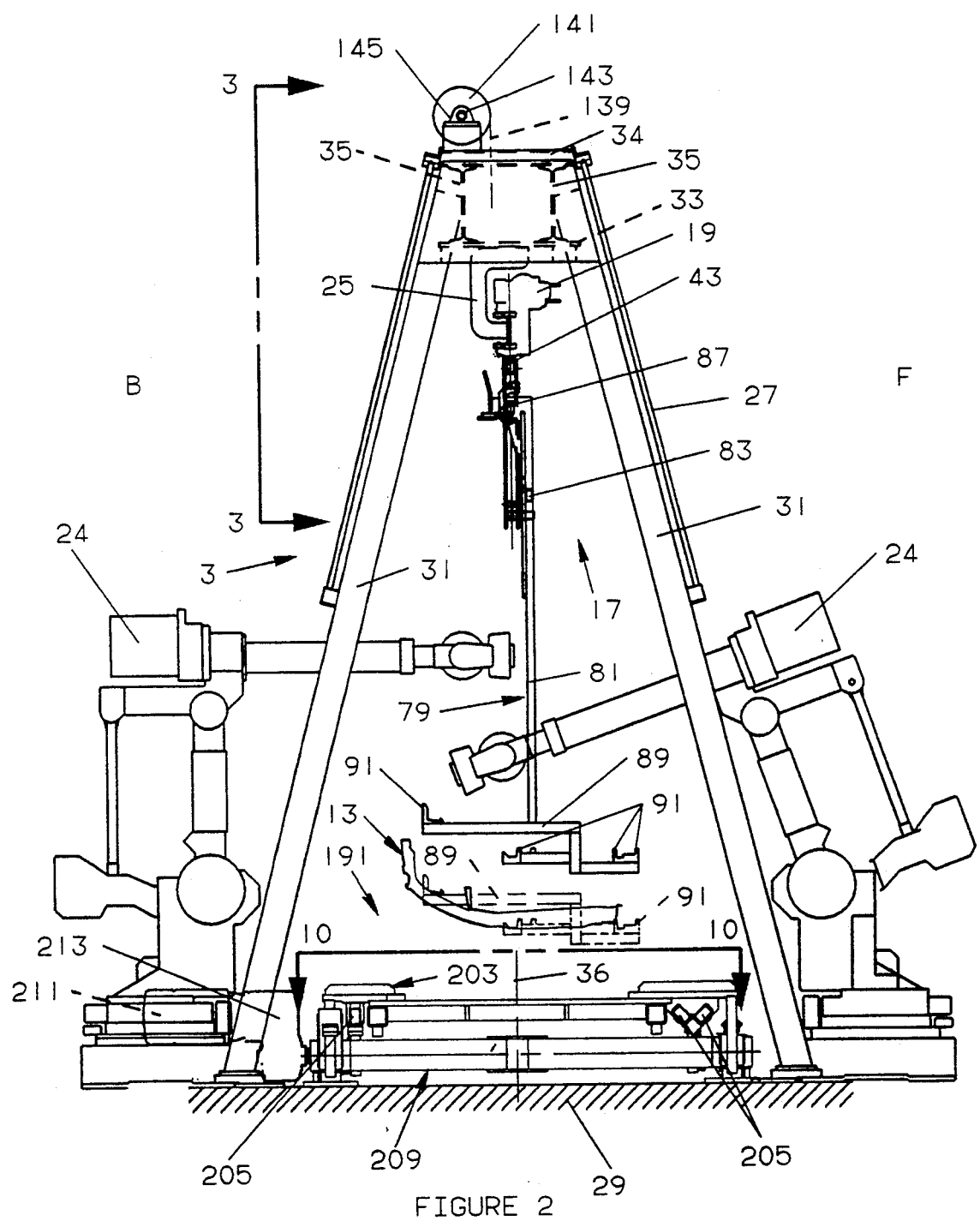
FIG. 2 is an enlarged cross sectional view taken along lines 2—2 of FIG. 1.
Figure 3:
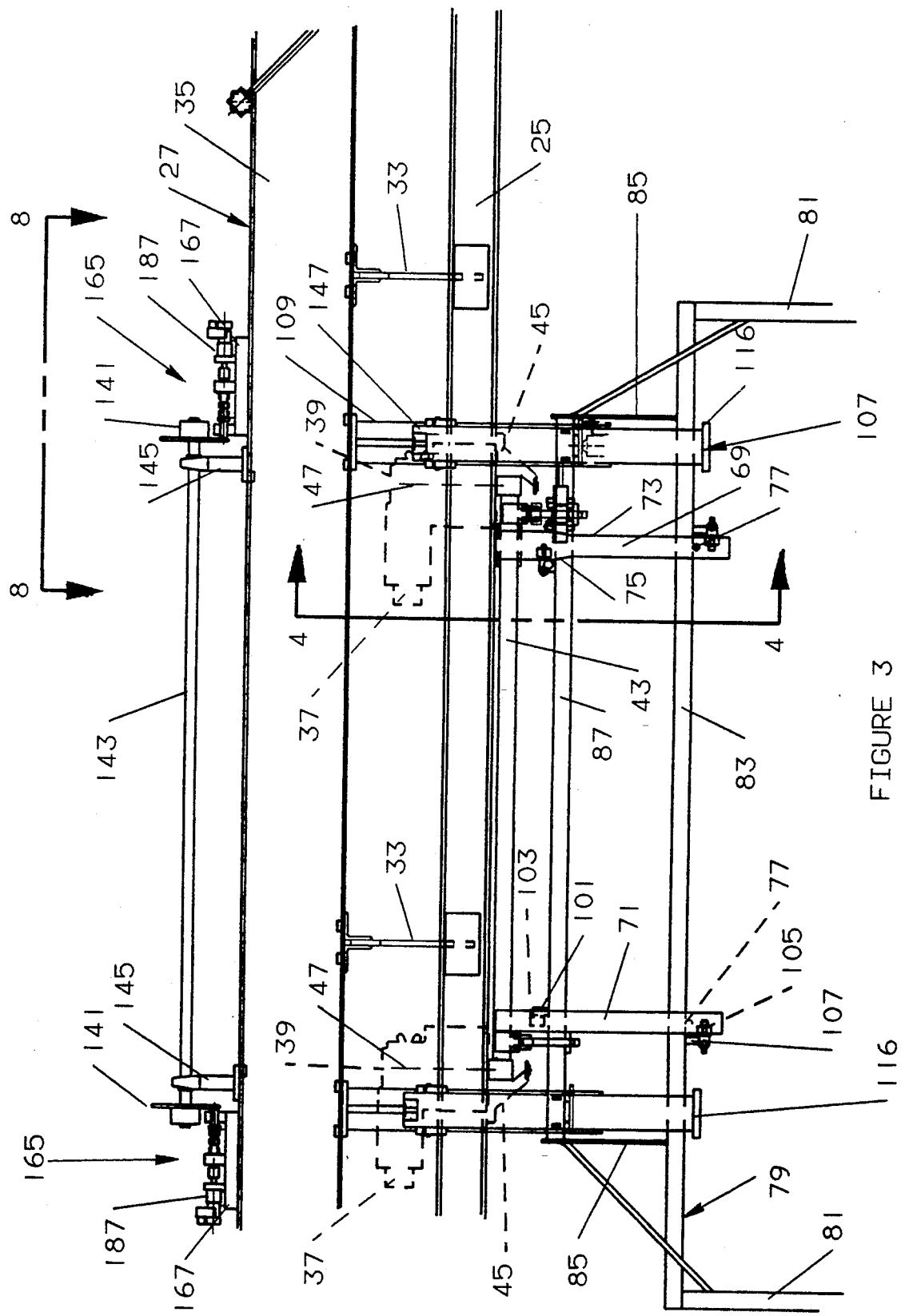
FIG. 3 is an enlarged partial view taken along lines 3—3 of FIG. 2.

With particular attention to FIGS. 2 and 3, the automatic monorail system 17 includes a sturdy framework 27, which is anchored to the factory foundation 29. The framework 27 may be constructed as a series of longitudinally spaced pairs of legs 31 that converge upwardly and are joined at their upper ends by cross members 33 and 34. Longitudinally extending I-beams 35 connect the pairs of legs 31 and the cross members 33, 34 into a closed loop. The monorail 25 is suspended from the framework cross members 33. The monorail defines the actual path 22 between and above the work stations 5, 7, 9, and 11 traveled by the trolleys 19.

For convenience, it will be assumed that the framework 27 and the automatic monorail system 17 are symmetrical about a vertical plane 36 that is coincident with the path 22. It will further be assumed that the side of the automatic monorail system to the right of the plane 36 in FIG. 2 is the front F of the automatic monorail system, and that the side of the automatic monorail system to the left of the plane 36 in FIG. 2 is the back B of the system.

TROLLEYS

The trolleys 19 travel along the monorail 25 and thus follow the path 22. Each trolley comprises one or more electric motors 37 and a pair of longitudinally spaced housings 39. The housings 39 are equipped with wheels, not shown, for riding along the monorail, as is known in the art. Power for the motors 37 is supplied from electric conductors carried on an aluminum rail 41. Also see FIG. 4. Sliders on the trolley housings 39 pick up power from the electric conductors on the aluminum rail 41 in known manner for conducting power to the motors 37. The motors drive the trolleys independently of each other.

The housings 39 of each trolley 19 are connected by a long beam 43. The ends of the beam 43 are pivotally connected to the respective housings 39 by appropriate bearings 45 for pivoting about respective axes 47. That construction enables the trolleys to negotiate the curves of the monorail path 22 without difficulty.

Figure 6:
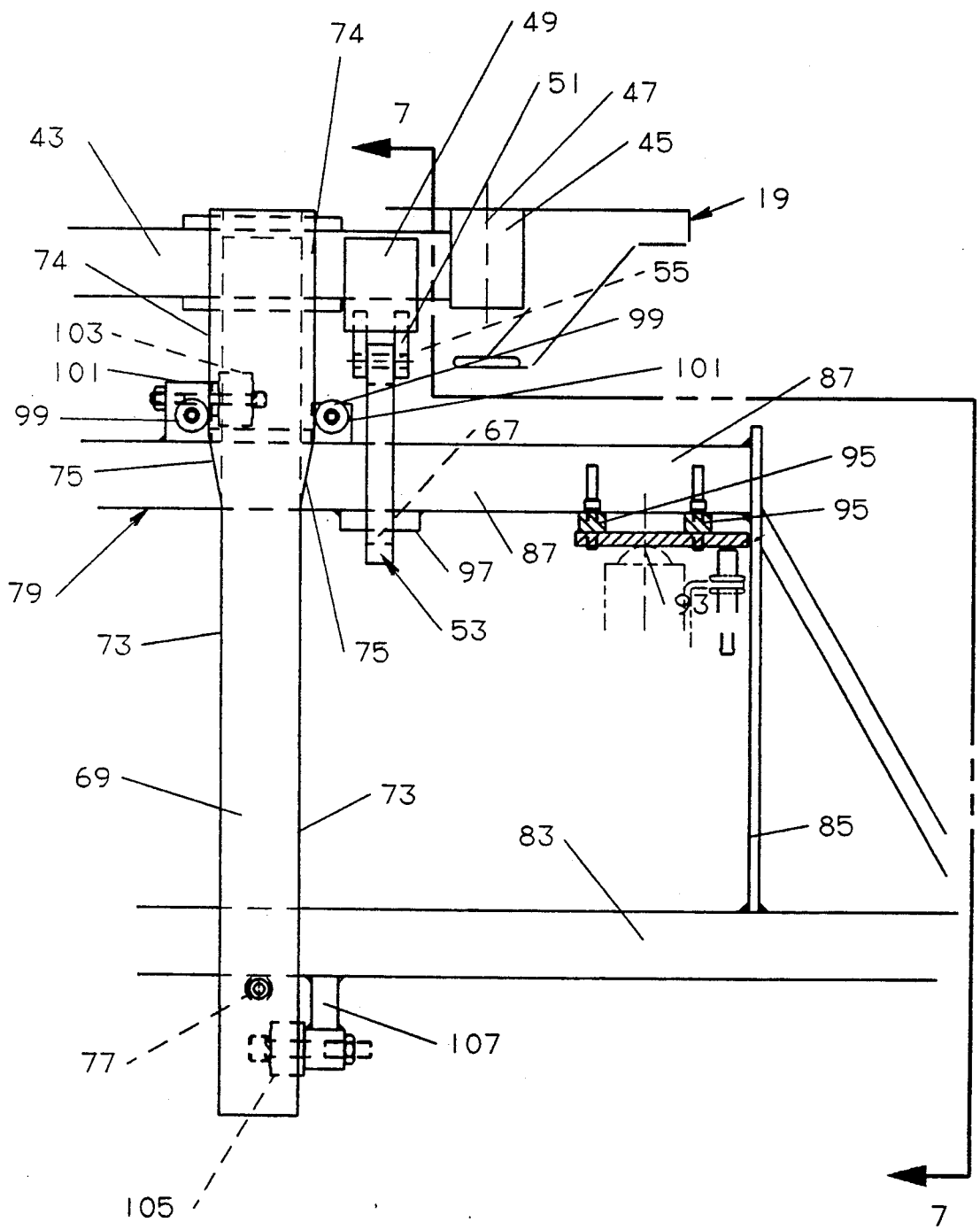
FIG. 6 is a partial view taken along lines 6—6 of FIG. 4.
Figure 7:
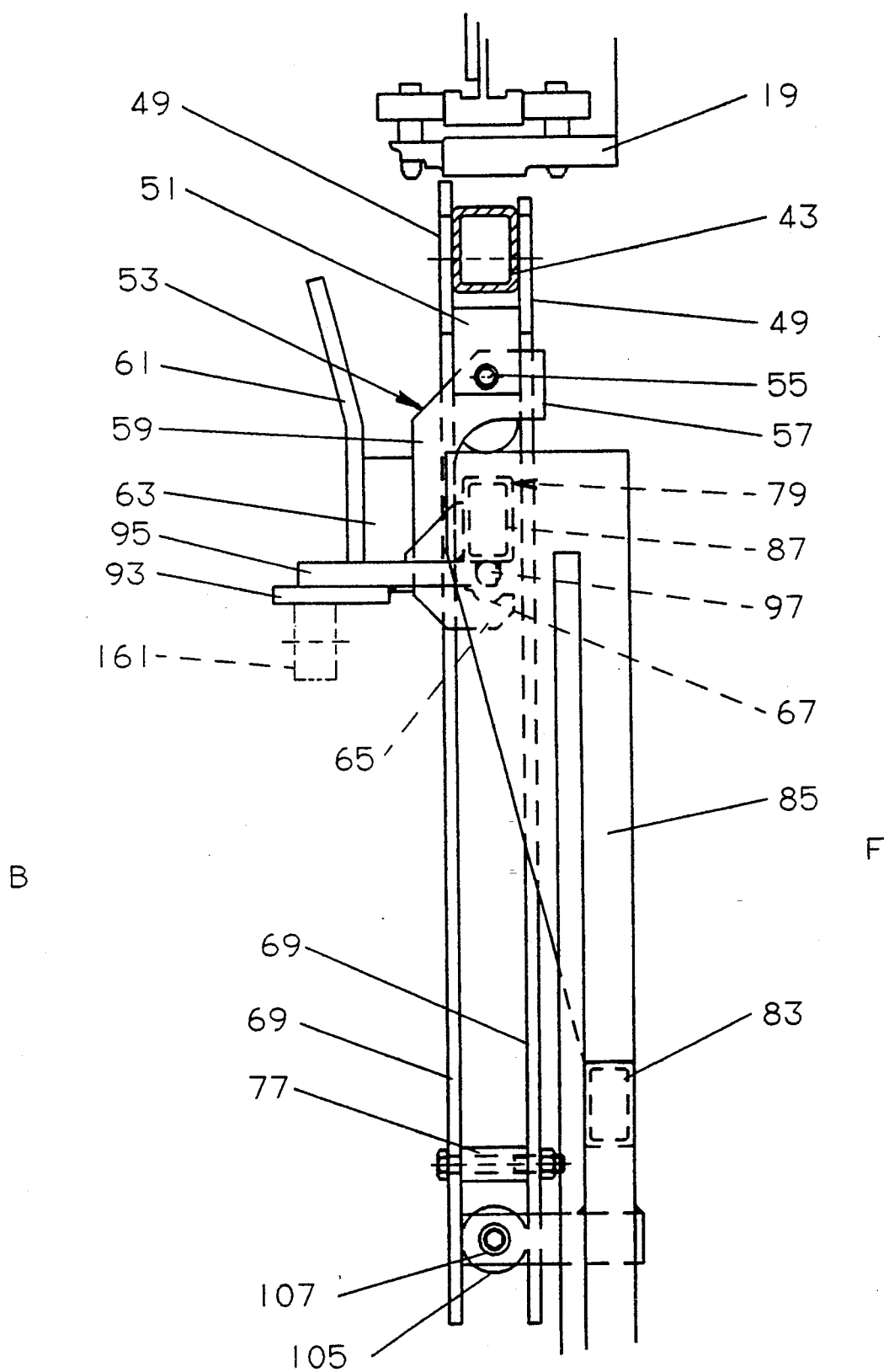
FIG. 7 is a view taken along lines 7—7 of FIG. 6.

Mounted to the front and back sides of the trolley beam 43 near each electric motor 37 and housing 39 is a first pair of plates 49, FIGS. 6 and 7. A second pair of plates 51 are welded between each of the pairs of plates 49. The plates 51 of each pair are spaced to receive a generally C shaped latch 53 between them. The open sides of the latches 53 are toward the front side F of the automatic monorail system 17. Each latch is pivotally connected to the associated plates 51 by a pin 55 passing through the latch upper leg 57. To the back leg 59 of each latch is attached a lever 61. A spacer block 63 is interposed between the latch back leg 59 and the lever 61. The lower leg 65 of each latch is formed with an arcuate recess 67.

Attached to the trolley beam 43 near each pair of plates 49 are pairs of elongated plates 69 and 71. The side edges 73 of the plates 69 are tapered at reference numerals 75 to converge in a downward direction for a purpose to be explained presently. The lower ends of the plates 69 and 71 of each pair are preferably tied together with respective tube and screw arrangements 77.

CARRIER

Supported by the latches 53 of each trolley 19 is a workpiece carrier 79. As best shown in FIGS. 2 and 3, the workpiece carrier 79 is comprised of two longitudinally spaced vertical posts 81 joined at their upper ends by an upper horizontal member 83. Spaced above and tied to the upper horizontal member 83 by suitable end plates 85 is an upper support beam 87. In the construction illustrated, the upper support beam 87 does not lie in the same vertical plane as the posts 81 and upper horizontal member 83.

Fixed to the lower ends of the carrier posts 81 is a generally horizontal workpiece supporting platform 89. The size and configuration of the platform 89 may be varied in any manner to suit the particular workpieces 13 being transported through the automatic assembly system 3 by the automatic monorail system 17. In general, the workpieces are supported on the platform 89 by a series of upstanding fingers or antlers 91 appropriate for the particular workpieces.

The workpiece carrier 79 is further comprised of a pair of bars 93 located near the opposite ends of the upper support beam 87, FIGS. 4-7. Each bar 93 is welded or otherwise secured to the upper support beam by one or more brackets 95. The brackets 95 locate the respective bars on the back side B of the automatic monorail system.

Welded to the underside of the carrier upper support beam 87 in alignment with each latch 53 of the trolley 19 is a short rod 97. In the usual situation, the carrier rods 97 fit within the recesses 67 of the respective latches 53 such that the workpiece carrier 79 is supported on the trolley 19 by the two trolley latches. In FIGS. 6 and 7, the carrier 79 is shown positioned a short distance above the latch recesses, as will be explained shortly. When supported by the trolley 19, the carrier is located vertically such that the platform 89 and the workpieces 13 on it are at a higher elevation above the building foundation 29 than the topmost components of the work stations 5, 7, 9, and 11 (FIGS. 1 and 2). Consequently, the trolley can transport the carriers along the monorail path 22 without hindrance.

To locate and guide the workpiece carrier 79 within its trolley 19, the carrier includes a number of cam followers. One set of cam followers 99 is mounted in suitable bearing blocks 101 welded to the carrier upper support beam 87. The cam followers 99 are spaced apart to guide on the opposite edges 74 of one of the trolley plates 69. Another cam follower 103 is rotatably mounted in one of the bearing blocks 101. The cam follower 103 substantially spans the space between the pair of plates 69. A fourth cam follower 105 is rotatably mounted in a bearing block 107 that is secured to the carrier upper horizontal member 83. The cam follower 105, like the cam follower 103, spans the space between the plates 69. The cam followers 103 and 105, together with their respective bearing blocks 101 and 107, are duplicated at the opposite end of the carrier in conjunction with the trolley plates 71, FIG. 3.

LOWERATOR MECHANISM

Figure 4:
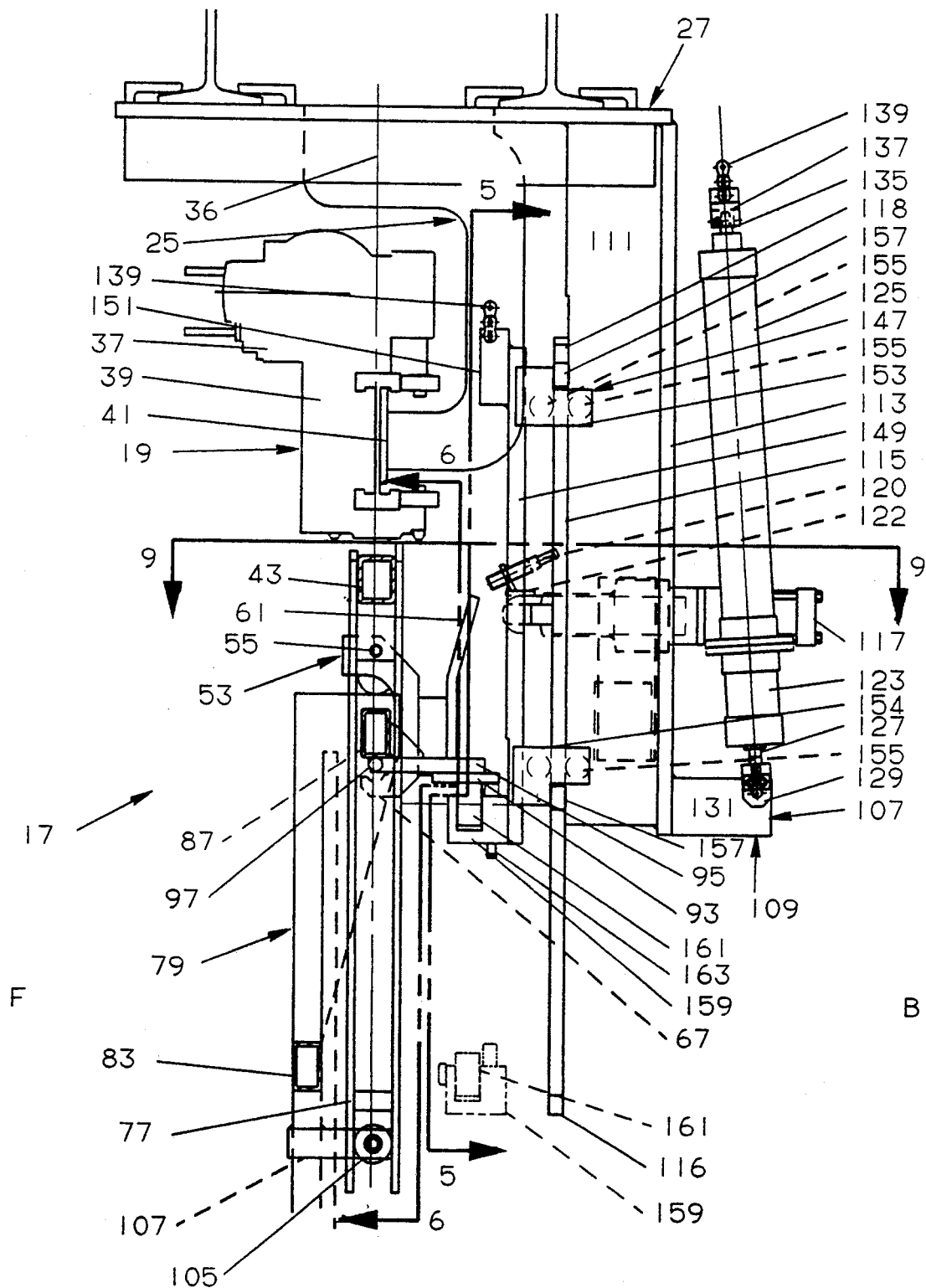
FIG. 4 is an enlarged view taken along lines 4—4 of FIG. 3.
Figure 5:
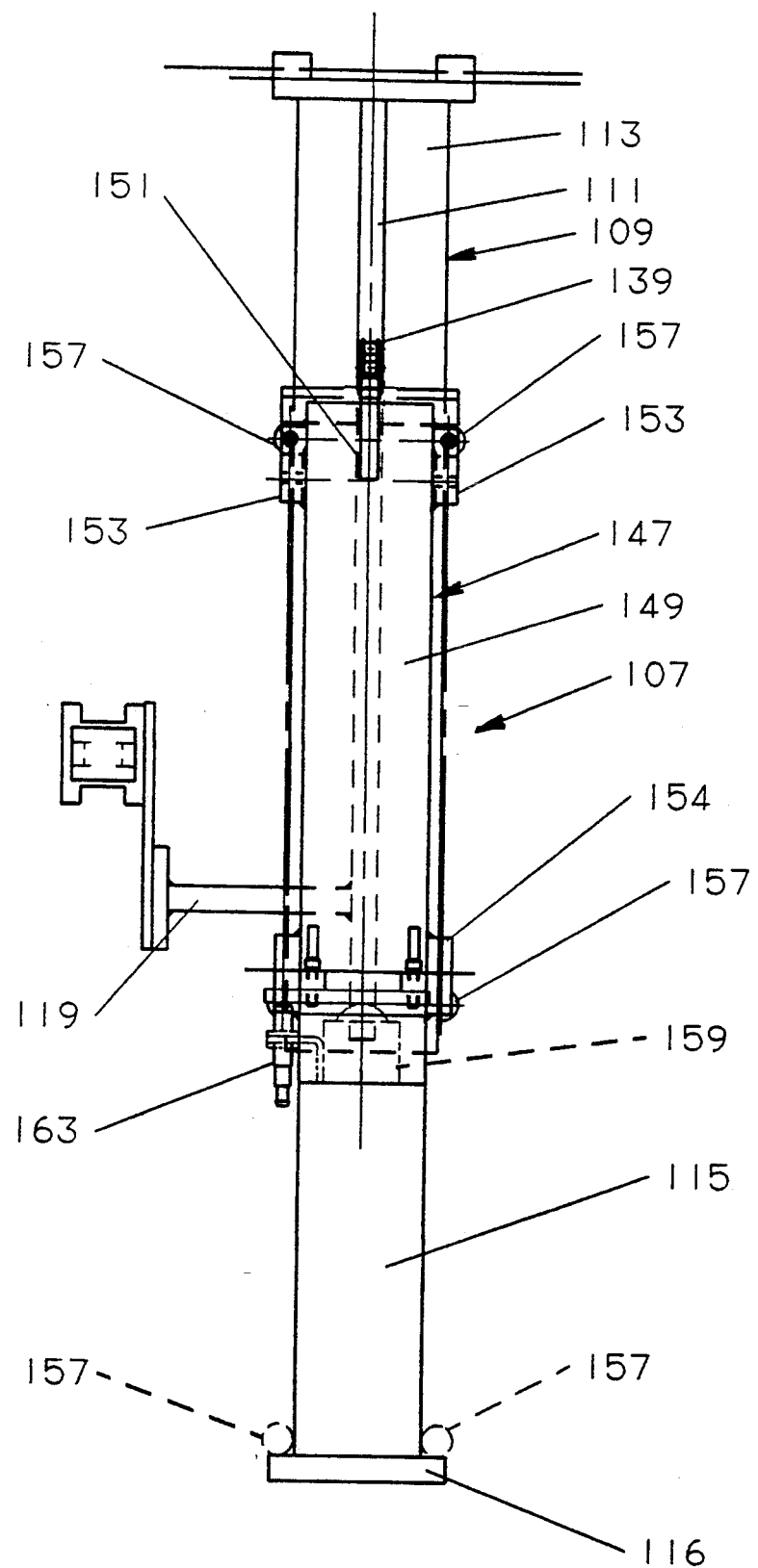
FIG. 5 is a partial view taken along lines 5—5 of FIG. 4.
Figure 9:
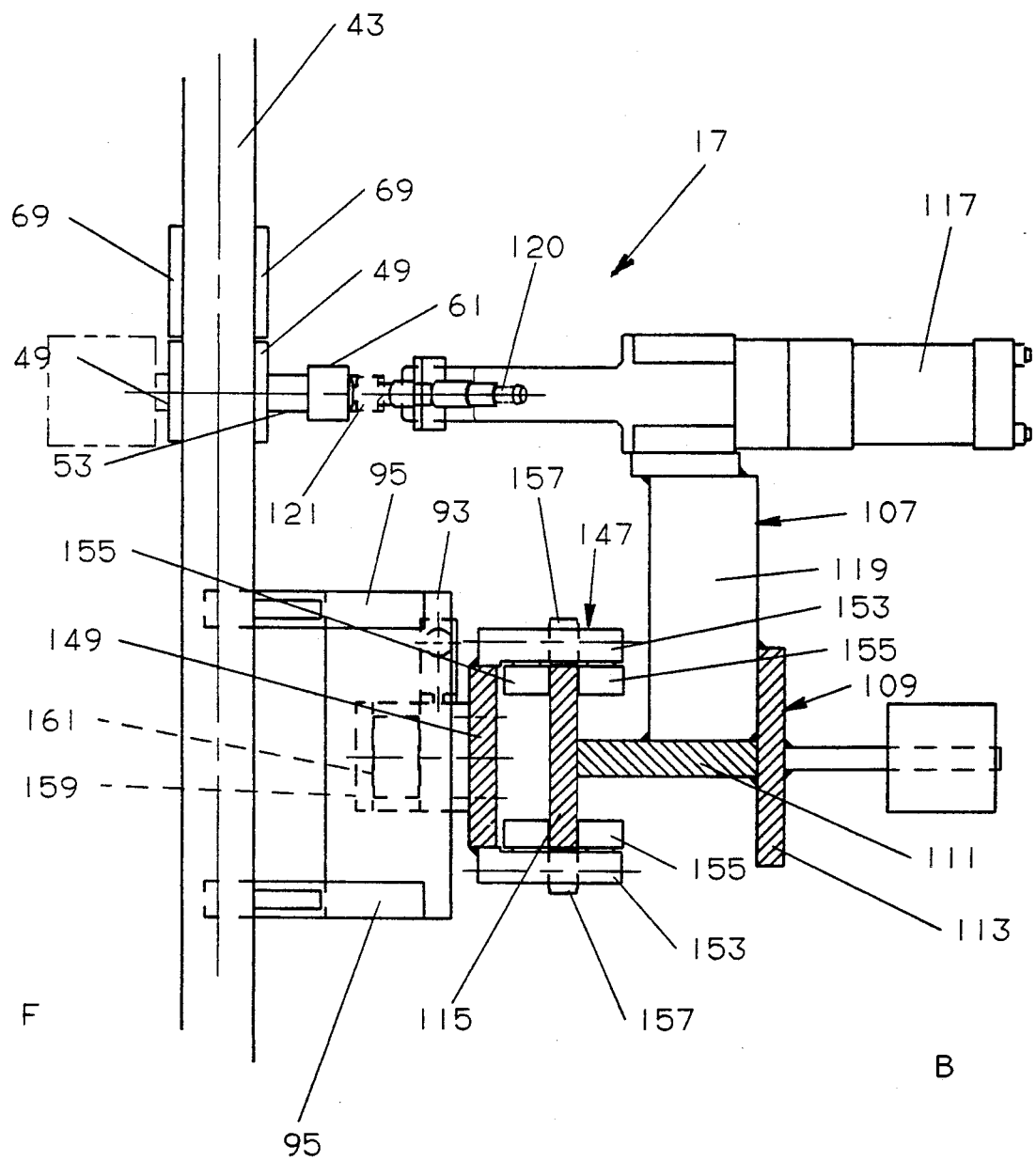
FIG. 9 is a cross sectional view taken along lines 9—9 of FIG. 4.

An important feature of the automatic monorail system 17 is that the workpiece carriers 79, together with the workpieces 13 supported thereon, can be rapidly lowered into the work stations 5, 7, 9, and 11 without corresponding movement of the trolley 19 or the monorail 25. With reference to FIGS. 4, 5, and 9, a lowerator mechanism 107 is mounted to the framework 27 in connection with each of the work stations. Each lowerator mechanism 107 comprises a pair of vertically oriented bases 109 secured to the framework. Each base 109 has a generally H-shaped cross section with a central plate 111, a back plate 113, and a front plate 115. The front plate 115 extends downwardly substantially farther than the central and back plates 111 and 113, respectively. To the lower end of the front plate is attached a stop bar 116. Another stop bar 118 is attached to the upper end of the front plate.

A double acting pneumatic cylinder 117 is secured to a plate 119 that extends horizontally from each base 109. The piston rod 121 of the cylinder 117 is aligned with the free end of the lever 61 of a latch 53 when a trolley 19 is stopped above a work station 5, 7, 9, or 11. Actuation of the cylinders 117 in a first direction extends the piston rods 121 to contact the respective latch levers and rotate the latches counterclockwise with respect to FIG. 4 and clockwise with respect to FIG. 7 about pins 55. Actuation of the cylinders 117 in the second direction retracts the piston rods 121 away from the latch levers. The cylinders 117 are normally retracted. A proximity switch 120 is mounted to a bracket 122. The bracket 122 is attached to one of the base plates 119 and is designed in a manner that locates the proximity switch 120 near the associated latch lever 61.

The lowerator mechanism 107 at each work station 5, 7, 9, and 11 further comprises two sets of second and third double acting pneumatic cylinders 123 and 125, respectively. The piston rods 127 of the second cylinders 123 are pivotally connected by a clevis 129 to a lug 131 welded to the respective bases 109. The closed ends of the cylinders 123 and 125 of each set thereof are fastened together. The stroke of the second cylinders is quite short, being on the order of approximately 1 inch. The stroke of the third cylinders is much longer, preferably being approximately 14 inches. Normally, the second cylinders are extended, and the third cylinders are retracted. The piston rod 135 of each third cylinder 125 is connected by a clevis 137 to one end of a chain 139. The chain 139 is trained around a sprocket 141, FIGS. 2, 3, and 8. The sprocket 141 is mounted on one end of a long shaft 143. In turn, the shaft 143 is rotatably supported in a pair of pillow blocks 145 fastened to the top of the framework 27. Thus, the shaft 145 and sprockets 141 connect the two chains 139 of the lowerator mechanism 107 to each other.

The second end of each chain 139 is connected to a slide 147. In the construction best illustrated in FIGS. 4, 5, and 9, each slide 147 comprises a long plate 149, to the upper end of which is welded a block 151 that connects to the second end of the chain 139. Also welded to the long plate 149 at its upper end are a pair of legs 153. A second pair of similar legs 154 are welded near the lower end of the plate 149. Rotatably mounted in each of the legs 153, 154 are a pair of first rollers 155. The rollers 155 of each pair thereof are spaced to receive the opposed front and back faces of the front plate 115 of the base 109 between them. Each leg 153, 154 also has a second roller 157 mounted for rotation therein. The rollers 157 contact the associated side edges of the base front plate 115. In that manner, the slide is guided at its upper and lower ends in a first horizontal direction by the rollers 155 and in a second horizontal direction by the rollers 157.

Also attached to the lower end of each slide plate 149 is a block 159 with a roller 161 mounted therein. The rollers 161 are transversely aligned with the bars 93 that extend from the workpiece carrier upper support beam 87 when the trolley is stopped at a work station 5, 7, 9, and 11. In addition, the rollers 161 are vertically aligned by means of the corresponding blocks 159 under the associated carrier bars 93. Also mounted in the blocks 159 are respective proximity switches 163.

INDEXING TOOL TRAYS

Further in accordance with the present invention, the automatic assembly system 3 comprises in-line transfer of tooling for holding and clamping different sets of workpieces 13 corresponding with the different bodysides 202, 204, and 206 at the work stations 5, 7, 9, and 11. Looking at FIGS. 1, 2, and 10-12, the particular automatic assembly system shown is designed to process three different bodysides. Accordingly, three tooling trays 197, 199, and 201 are incorporated into each of the four generally similar tooling mechanisms 189, 191, 193, and 195 associated with the work stations 5, 7, 9, and 11, respectively. For example, tooling tray 197 may be designed to accept the workpieces necessary for assembling the bodyside 202 of a two-door automobile; tooling tray 199 may be designed for the workpieces necessary for the bodyside 204 of a three-door automobile; and tooling tray 201 may be designed for the workpieces necessary for the bodyside 206 of a four-door automobile. It will be appreciated, of course, that the automatic assembly system can be set up to handle more or fewer than three different bodysides, and thus the tooling mechanisms 189, 191, 193, and 195 may have more or fewer than three tool trays.

In-line tooling transfer is achieved by aligning the tool trays 197, 199, and 201 of each tooling mechanism 189, 191, 193, and 195 end-to-end in a direction parallel to and directly under the monorail path 22. The tooling trays of each tooling mechanism are constructed into a common tooling fixture 203. The fixture 203 is supported by rollers 205 for reciprocation in the directions of arrow 207 along a tooling bed 209. The workpiece processing equipment, such as welding robots 24, is located at the transverse centerline 210 of each tooling bed 209, which corresponds to the location of the associated work station. Reciprocation of the fixture 203 is controlled so as to locate the desired tooling tray at the work station and thus between the processing equipment 24.

To reciprocate a tooling fixture 203 and the associated tooling trays 197, 199, and 201, each tooling bed 209 includes an electric motor 211 and a gear reducer 213. The output shaft 214 of the gear reducer 213 is connected to a pinion 215 rotatably mounted in the bed 209. Mounted to the fixture is a long rack 217 that meshes with the pinion 215. Thus, energizing the motor 211 causes rotation of the pinion 215 and translation of the fixture. The motor is controlled to rotate an amount corresponding to properly locating the desired tooling tray at the work station. To prevent the fixture from running off the ends of the tooling bed, a pair of snubbers 219 are mounted to each end of the bed. The snubbers 219 may be in the form of known shock absorbers.

OPERATION

As mentioned previously, the second lowerator cylinders 123 of the lowerator mechanisms 107 are normally extended, and the third lowerator cylinders 125 are normally retracted. See FIGS. 4, 5, and 7. In that situation, the workpiece carrier 79 is supported by the rods 97 engaging the recesses 67 of the two trolley latches 53. Also, the slide rollers 161 of the lowerator mechanisms 107 are spaced slightly below the carrier bars 93 (a position not shown in FIGS. 4, 5, or 7). Accordingly, a trolley 19 propelled by the electric motors 37 can travel in the downstream direction 21 along the monorail path 22 without contacting the lowerator mechanisms.

When the trolley 19 reaches a work station, such as work station 5, suitable controls deenergize the electric motors 37 to stop the trolley. The trolley is controlled to stop at a location such that the two carrier bars 93 are in transverse alignment and vertical alignment with the associated rollers 161 of the lowerator mechanism 107 at that work station. The proximity switch 163 verifies that the carrier is properly aligned at the work station.

Simultaneously with the travel of a trolley 19 to the work station 5, the electric motor 211 of the tooling bed 209 is controlled to translate the tooling fixture 203 such that the proper tooling tray 197, 199, or 201 for the particular workpieces 13 transported by the trolley is at the work station 5. With the trolley and tooling tray at their proper respective locations, the first cylinders 123 of the lowerator mechanism 107 are actuated to retract. Such retraction of the second cylinders raises the two slides 147 approximately one inch, thereby causing the rollers 161 to contact the undersides of the respective carrier bars 93 and to raise the carrier off the latches 53 by approximately 0.50 inches to the position shown in FIGS. 4, 5, and 7. The weight of the carrier 79 is thus transferred from the latches to the lowerator slides, and through the chains 139, cylinders 123 and 125, and bases 109 to the framework 27. The stop bars 116 provide overtravel protection for the upward movement of the slides.

The first cylinders 117 are then extended to contact the levers 61 of the associated latches 53 and pivot the latches counterclockwise with respect to FIG. 4 and clockwise with respect to FIG. 7 about their respective pins 55. As a result, the latch lower legs 65 swing out of the vertical plane of the carrier upper horizontal member 87.

At that point, the lowerator mechanism third pneumatic cylinders 125 are actuated to their extended positions. As a result, the slides 147 lower along their respective bases 109, and the workpiece carrier 79 lowers accordingly. A typical lowering stroke is approximately 14 inches. The stop bars 118 prevent overtravel of the carrier in the downward direction.

As the workpiece carrier 79 is initially lowered by the slides 147, the carrier is guided by the cam followers 99, 103, and 105 mounted to the carrier and contacting the trolley plates 69 and 71. As best shown in FIG. 6, the tapered sections 75 of the trolley plate 69 cause the cam followers 99 to lose contact with the side edges 73 of the plate 69 as the carrier descends. As a consequence, the carrier is unguided through a short horizontal distance in the direction of the path 22. The carrier is thus free to float within the unguided distance. The rollers 161 under the carrier bars 93 aid in permitting the carrier to float. The cam followers 105 also lose contact with the plates 69 and 71, thereby enabling the carrier platform to swing slightly in the directions normal to the path 22.

The carrier 79 lowers such that the workpieces 13 contact and become supported by the tooling tray 197, 199, or 201 at the work station 5 (FIG. 1). The connection of the sprockets 141 of the two lowerator chains 139 to the common shaft 145 maintains an even descent of both ends of the carrier. To assure complete and proper transfer of the workpieces from the carrier platform 89 to the work station tooling tray, the cylinders 125 lower the carrier platform approximately one inch past the point of workpiece transfer from the carrier fingers 91 to the work station tooling. As a consequence, support of the workpieces is completely and properly transferred from the carrier platform fingers to similar fingers or other guide members on the work station tooling. The fingers and other guide members on the tooling tray at the work station contact and direct the workpieces accurately to their proper locations for the operations to be performed on them. The floating of the carrier 79 in the directions of the path 22 permitted by the absence of contact between the carrier cam followers 99 and the side edges 73 of the trolley plate 69 and by the rollers 161 under the carrier bars 93, and the swinging of the carrier in the directions normal to the path 22 permitted by the absence of contact between the cam followers 105 and the faces of the plates 69 and 71, greatly facilitate entry and lead-in of the tooling fingers to properly locate the workpieces.

When the workpiece carrier 79 is in the lowered position, the workpieces 13 are clamped by the tooling in the tooling tray 197, 199, or 201. The necessary operations, such as welding by robots 24, are performed on the workpieces. At the end of the operation, the welding robots 24 withdraw from around the workpieces 13. The tooling in the tooling tray unclamps the workpieces. The pneumatic cylinders 125 of the lowerator mechanism 107 are actuated to retract, thus raising the carrier and workpieces 13 by means of the slides 147 out of the work station 5. As the carrier approaches its raised position, the cam followers 99 contact the tapers 75 of the side edges 73 of the trolley plates 69, and the cam followers 105 reestablish contact with the faces of the plates 69 and 71. The cam followers 99, 103, and 105 guide the carrier to its proper raised location whereat the carrier rods 97 are at an elevation about 0.50 inches higher than the recesses 67 of the latches 53.

At the end of the stroke of the cylinders 125, the first cylinders 117 are actuated to retract. As a consequence, the two latches 53 pivot by gravity about their respective pins 55 such that their lower legs 65 underlie the carrier rods 97. The proximity switches 120 verify that the latches have indeed returned to their extended positions. Finally, the cylinders 123 are actuated to extend and thereby lower the slides 147 approximately one inch. By doing so, the weight of the carrier 79 is transferred from the rollers 161 on the slides to the latches 53 on the trolley 19. At that point, the cycle is complete.

The outstanding advantage of the in-line transfer capabilities of the tooling mechanisms 189, 191, 193, and 195 is that the processing equipment 24 may be permanently anchored to the factory foundation 29 at the respective work stations 5, 7, 9, and 11. That design greatly enhances the versatility of the automatic assembly system 3, as well as simplifies maintenance and alterations of the processing equipment 24. In the illustrated example, combinations of workpieces 13 associated with the three different bodysides 202, 204, and 206 can be loaded randomly on the workpiece carriers 79 at the loading station 15. The tooling bed motors 211 are controlled such that the proper tooling tray 197, 199, or 201 is indexed to the work station as a particular workpiece combination approaches that work station.

At the completion of a cycle, the trolley 19 is controlled to travel downstream along the monorail path 22 to the next work station, and the cycle is repeated.

SAFETY INTERLOCK

Figure 8:
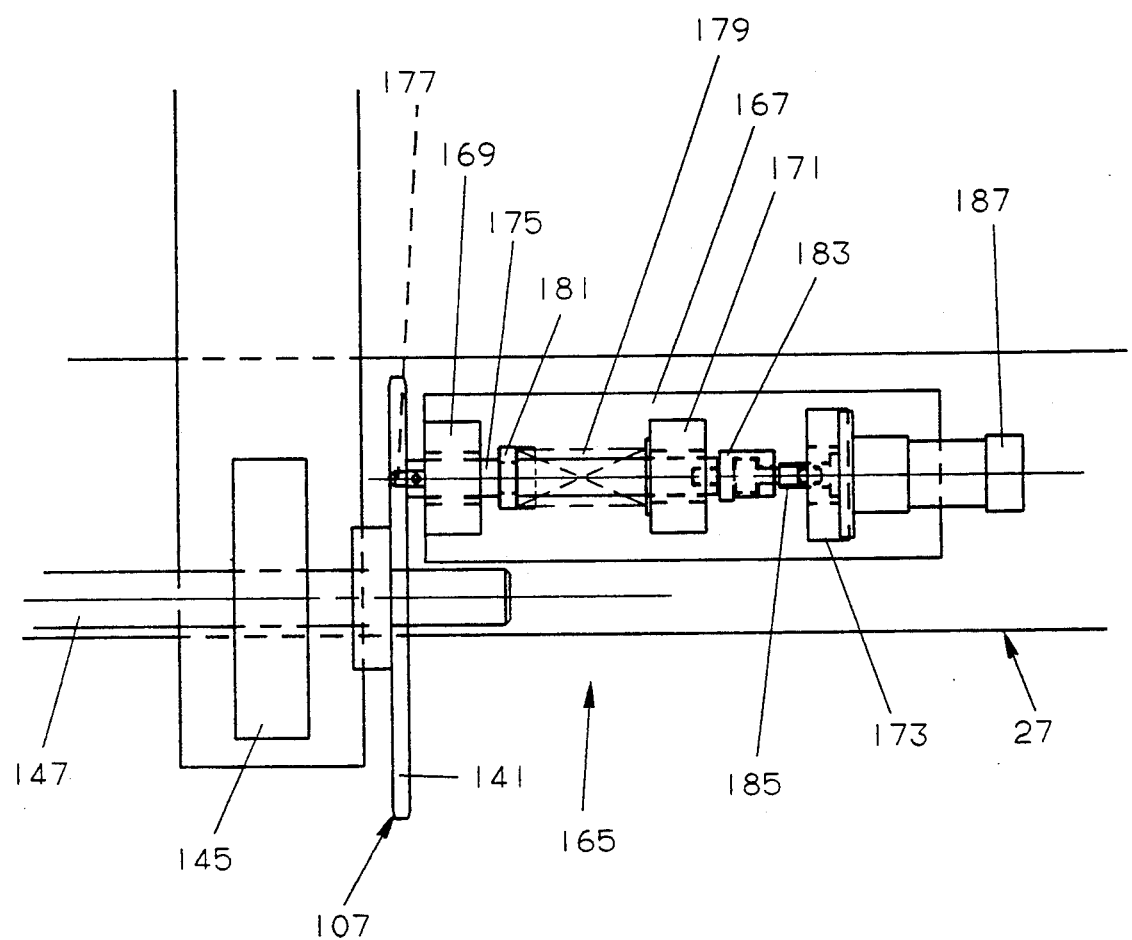
FIG. 8 is an enlarged view taken along lines 8—8 of FIG. 3.

To prevent uncontrolled lowering of the carrier 79 and the workpieces 13 in case of loss of pneumatic pressure to the lowerator mechanism cylinders 125, the automatic monorail system 17 further comprises a pair of safety interlocks 165 in conjunction with each lowerator mechanism 107, FIGS. 3 and 8. Each safety interlock 165 has a base 167 mounted to the framework 27. The base 167 has three upstanding blocks 169, 171, and 173 welded to it. The blocks 169 and 171 guide a plunger 175 that has a pin at the first end 177 thereof. The plunger pin end 177 is radially aligned with a number of holes spaced circumferentially around the sprocket 141 of the lowerator mechanism 107. The plunger 175 is biased by a spring 179 acting between a shoulder 181 of the plunger and the block 171 to urge the pin end thereof into engagement with one of the sprocket holes. The second end of the plunger is connected via a coupling 183 to the piston rod 185 of a pneumatic cylinder 187. The pneumatic cylinder 187 is tapped into the same source of pneumatic pressure as the cylinders 123 and 125 of the lowerator mechanism (FIG. 4).

During normal operation, the pneumatic cylinders 187 are energized to their retracted positions so as to overcome the force of the springs 179 and withdraw the plunger pin ends 177 from the respective sprockets 141. However, in the event that pneumatic pressure is lost to the cylinders 125 and thus to the cylinders 187, the springs 179 force the cylinder piston rods 185 to extend such that the plunger pin ends 177 engage one of the holes in the associated sprockets 141. In that manner, rotation of the sprockets 141 is stopped, as is the motion of the chains 139 and slides 147. Consequently, uncontrolled lowering of the carrier 79 is prevented.

Since the trolleys 19 are driven independently of one another by their respective electric motors 37, the operations performed at a particular work station 5, 7, 9, or 11 need not occur simultaneously with the operations at any other work station. Although not shown in the drawings, one or more queue stations can be installed between the various work stations. Those features result in the very important benefit of enabling a particular work station to be taken out of service temporarily for maintenance without affecting operations at the other work stations, because the trolleys and their workpieces 13 can bank up at the queue stations upstream of the inoperative work station. As a result, throughput of the automatic assembly machine 3 is improved.

Thus, it is apparent that there has been provided, in accordance with the invention, an automatic assembly system 3 that efficiently and continuously assembles individual workpieces 13 loaded on the trolleys 19 at the loading station 15 into assembled bodysides 202, 204, and 206 for unloading at the unloading station 23. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. An automatic monorail system comprising:
  a. monorail means for defining a path above at least one work station;
  b. trolley means for traveling along the monorail means and for stopping above the work station, wherein the trolley means comprises:
    i. motor means for riding on the monorail means;
    ii. an elongated beam connected to the motor means;
    iii. latch means pivotally connected to the beam for selectively operating between an extended position whereat the latch means supports the carrier means and a retracted position, wherein the latch means comprises
      at least two generally C-shaped latches, each latch having a lower leg that underlies and supports the carrier means when the latch is in the extended position and that pivots clear of the carrier means when the latch is in the retracted position;
      plate means for pivotally connecting the respective latches to the trolley beam; and
      lever means attached to each latch for being contacted by the lowerator means to pivot the latch about the plate means between the extended and retracted positions thereof; and
    iv. guide means attached to the beam for guiding the carrier means as it is lowered to the work station by the lowerator means;
  c. carrier means selectively supported by the trolley means and traveling therewith along the monorail means for supporting and transporting a workpiece to the work station; and
  d. lowerator means mounted to the monorail means at the work station for selectively transferring the carrier means stopped thereat from the trolley means to the lowerator means and for lowering the carrier means and the workpiece supported thereon to the work station.
2. The automatic monorail system of claim 1 wherein:
  a. the lower leg of each latch is formed with a recess; and
  b. the carrier means comprises rod means for fitting within the recesses of the respective latches when the carrier means is supported by the latches.
3. The automatic monorail system of claim 1 wherein the lowerator means comprises:
  a. a pair of vertically oriented bases mounted to the monorail means above the work station;
  b. first actuator means mounted to each base in operative association with a respective latch for selectively operating to a first position whereat it contacts the associated latch lever means to pivot the latch such that the lower leg thereof is clear of the carrier means and to a second position whereat it is retracted from the latch lever means to thereby enable the latch to pivot such that the lower leg thereof underlies the carrier means;
  c. a slide guided for reciprocation along each base; and d. second actuator means mounted to each base and connected to a respective slide for operating to a first position whereat the slide is in a first position to lift the carrier means off the latches and to a second position whereat the slide lowers the carrier means to the work station.

4. The automatic monorail system of claim 3 wherein each second actuator means comprises:
   a. a second actuator mounted to each base;
   b. a chain connecting the second actuator to a respective slide; and
   c. sprocket means rotatably mounted to the monorail means for connecting together the chains of the second actuators and their respective slides to thereby maintain an even lowering of the carrier means to the work stations.

5. The automatic monorail system of claim 4 further comprising:
   a. plunger means mounted to the monorail means; and
   b. fourth actuator means mounted to the monorail means for operating the plunger means between a first position whereat the plunger means engages the sprocket means to prevent rotation thereof and to a second position whereat the plunger means is withdrawn from the sprocket means to permit rotation thereof,
so that uncontrolled lowering of the carrier means is prevented by actuation of the fourth actuator means to the first position thereof to engage the plunger means with the sprocket means.

6. The automatic monorail system of claim 5 wherein the fourth actuator means comprises:
   a. a fourth actuator connected to the plunger means and operable between a first position whereat the plunger means is in engagement with the sprocket means to prevent rotation thereof and a second position whereat the plunger means is withdrawn from the sprocket means; and
   b. biasing means for biasing the plunger means and the fourth actuator to the respective first positions thereof, the fourth actuator overcoming the biasing means and withdrawing the plunger means to the second position thereof when the fourth actuator is operated to the second position thereof,
so that the biasing means biases the plunger means to engage the sprocket means until the fourth actuator operates to overcome the biasing means.

7. The automatic monorail system of claim 6 wherein:
   a. the second and fourth actuators comprise second and fourth pneumatic cylinders, respectively; and
   b. the automatic monorail system further comprises pneumatic circuit means for connecting the second and fourth pneumatic cylinders to a common source of pneumatic pressure and for operating the fourth pneumatic cylinder to the first position thereof when pneumatic pressure is lost to the pneumatic circuit means,
so that uncontrolled lowering of the carrier means is prevented if pneumatic pressure is lost to the second pneumatic cylinders.

8. An automatic monorail system comprising:
   a. monorail means for defining a path above at least one work station;
   b. trolley means for traveling along the monorail means and for stopping above the work station, wherein the trolley means comprises:
      i. motor means for riding on the monorail means;
      ii. an elongated beam connected to the motor means;
      iii. latch means pivotally connected to the beam for selectively operating between an extended position whereat the latch means supports the carrier means and a retracted position; and
      iv. guide means attached to the beam for guiding the carrier means as it is lowered to the work station by the lowerator means, wherein the trolley means guide means comprises at least one pair of spaced apart first and second plates, the plates having respective opposite side edges;
   c. carrier means selectively supported by the trolley means and traveling therewith along the monorail means for supporting and transporting a workpiece to the work station, wherein the carrier means comprises first roller means for rolling between the trolley means spaced apart first and second plates to guide the carrier means in a first direction, and second roller means for rolling on the side edges of at least the first trolley means plate to guide the carrier means in a second direction; and
   d. lowerator means mounted to the monorail means at the work station for selectively transferring the carrier means stopped thereat from the trolley means to the lowerator means and for lowering the carrier means and the workpiece supported thereon to the work station.

9. The automatic monorail system of claim 8 wherein the side edges of the trolley means first guide plate defines tapered surfaces that converge downwardly to cause the carrier means second roller means to lose contact with the side edges of the trolley means first guide plate to thereby enable the carrier means to float through the distance between the side edges of the trolley means first guide plate and the second roller means when the carrier means second roller means is lowered below the tapered surfaces of the trolley means first guide plate.

10. An automatic monorail system comprising:
   a. monorail means for defining a path above at least one work station;
   b. trolley means for traveling along the monorail means and for stopping above the work station, wherein the trolley means comprises:
      i. motor means for riding on the monorail means;
      ii. an elongated beam connected to the motor means;
      iii. latch means pivotally connected to the beam for selectively operating between an extended position whereat the latch means supports the carrier means and a retracted position; and
      iv. guide means attached to the beam for guiding the carrier means as it is lowered to the work station by the lowerator means;
   c. carrier means selectively supported by the trolley means and traveling therewith along the monorail means for supporting and transporting a workpiece to the work station, wherein the carrier means comprises cam follower means for cooperating with the trolley means guide means to enable the carrier means to float in a direction parallel to the path defined by the monorail means as the carrier means is lowered to the work station; and
   d. lowerator means mounted to the monorail means at the work station for selectively transferring the carrier means stopped thereat from the trolley means to the lowerator means and for lowering the carrier means and the workpiece supported thereon to the work station, wherein the lowerator means comprises:
  i. base means mounted to the monorail means above the work station;
  ii. first actuator means secured to the base means for selectively contacting the trolley means latch means to pivot the latch means between the extended and retracted positions thereof;
  iii. slide means for reciprocating along the base means; and
  iv. second actuator means for selectively operating the slide means to contact the carrier means and raise it off the trolley means latch means and to lower the carrier means to the work station, wherein
    the slide means comprises support roller means for contacting and supporting the carrier means and for raising the carrier means off the trolley means latch means,
    so that the slide means support roller means aids the carrier means to float.

11. An automatic monorail system comprising:
  a. monorail means for defining a path above at least one work station;
  b. trolley means for traveling along the monorail means and for stopping above the work station, wherein the trolley means comprises:
    i. motor means for riding on the monorail means;
    ii. an elongated beam connected to the motor means;
    iii. latch means pivotally connected to the beam for selectively operating between an extended position whereat the latch means supports the carrier means and a retracted position; and
    iv. guide means attached to the beam for guiding the carrier means as it is lowered to the work station by the lowerator means;
  c. carrier means selectively supported by the trolley means and traveling therewith along the monorail means for supporting and transporting a workpiece to the work station; and
  d. lowerator means mounted to the monorail means at the work station for selectively transferring the carrier means stopped thereat from the trolley means to the lowerator means and for lowering the carrier means and the workpiece supported thereon to the work station, wherein the lowerator means comprises:
    i. base means mounted to the monorail means above the work station;
    ii. first actuator means secured to the base means for selectively contacting the trolley means latch means to pivot the latch means between the extended and retracted positions thereof;
    iii. slide means for reciprocating along the base means; and
    iv. second actuator means for selectively operating the slide means to contact the carrier means and raise it off the trolley means latch means and to lower the carrier means to the work station, wherein the second actuator means
      a first cylinder having a piston rod connected to the respective lowerator base and a closed end; and
      a second cylinder having a closed end fastened to the closed end of the first cylinder and a piston rod connected to an associated slide means, the first cylinder operating the associated slide to contact and raise the carrier means off the trolley means latch means and the second cylinder operating to lower the carrier means to the work station.

12. An automatic assembly system for processing a plurality of workpieces into an assembled product comprising:
  a. tooling means defining at least one work station for clamping the workpieces therein, wherein the tooling means comprises:
    i. a plurality of tooling trays, each tooling tray containing tools for clamping different predetermined workpieces for being processed into different predetermined assembled products; and
    ii. indexing means for bidirectionally indexing the tooling trays in directions parallel to and generally below the path defined by the monorail means to being a selected tooling tray to the work station to receive and clamp the predetermined workpieces thereat and to place the nonselected tooling trays at a location remote from the work station;
  b. processing means stationarily secured to a factory foundation at the work station for processing the workpieces thereat into the assembled product;
  c. monorail means anchored to the factory foundation for defining a path above the tooling means along which the workpieces and assembled products are transported;
  d. trolley means for traveling along the monorail means along the path defined thereby;
  e. carrier means supported by the trolley means for supporting the workpieces and the assembled products above the tooling means; and
  f. lowerator means mounted to the monorail means at the work station for selectively lowering the carrier means and the workpieces from the trolley means to the work station.

13. The automatic assembly system of claim 12 wherein the indexing means comprises:
  a. an elongated bed anchored to the factory foundation generally underneath and aligned with the path defined by the monorail means;
  b. fixture means for reciprocating along the bed, the tooling trays being constructed within the fixture means; and
  c. drive means for reciprocating the fixture means along the bed to bring the selected tooling tray to the work station to receive and clamp the predetermined workpieces.

14. An automatic assembly system for processing a plurality of workpieces into an assembled product comprising:
  a. tooling means defining at least one work station for clamping the work pieces therein;
  b. processing means stationarily secured to a factory foundation at the work station for processing the workpieces thereat into the assembled product;
  c. monorail means anchored to the factory foundation for defining a path above the tooling means along which the workpieces and assembled products are transported;
  d. trolley means for traveling along the monorail means along the path defined thereby;

e. carrier means supported by the trolley means for supporting the workpieces and the assembled products above the tooling means; and f. lowerator means mounted to the monorail means at the work station for selectively lowering the carrier means and the workpieces from the trolley means to the work station, wherein the trolley means comprises:

i. housing means for riding on the monorail means;

ii. an elongated beam connected to the housing means;

iii. latch means pivotally connected to the beam for selectively operating between a first position whereat the latch means underlies and supports the carrier means and a second position whereat the latch means is remote from the carrier means to thereby enable the lowerator means to lower the carrier means; and iv. guide means attached to the beam for guiding the carrier means as it is lowered to the work station by the lowerator means, wherein the trolley means guide means comprises at least one vertically oriented plate having opposed side edges that define tapered surfaces that converge downwardly; and the carrier means comprises a pair of rollers that roll on the respective guide edges of the guide means plate, the carrier means rollers losing contact with the side edges of the guide means plate to thereby enable the carrier means and the workpieces thereon to float as the carrier means and workpieces are lowered by the lowerator means to the work station.

15. An automatic assembly system for processing a plurality of workpieces into an assembled product comprising:

a. tooling means defining at least one work station for clamping the workpieces therein;

b. processing means stationarily secured to a factory foundation at the work station for processing the workpieces thereat into the assembled product;

c. monorail means anchored to the factory foundation for defining a path above the tooling means along which the workpieces and assembled products are transported;

d. trolley means for traveling along the monorail means along the path defined thereby;

e. carrier means supported by the trolley means for supporting the workpieces and the assembled products above the tooling means; and f. lowerator means mounted to the monorail means at the work station for selectively lowering the carrier means and the workpieces from the trolley means to the work station, wherein the trolley means comprises:

i. housing means for riding on the monorail means;

ii. an elongated beam connected to the housing means;

iii. latch means pivotally connected to the beam for selectively operating between a first position whereat the latch means underlies and supports the carrier means and a second position whereat the latch means is remote from the carrier means to thereby enable the lowerator means to lower the carrier means; and iv. guide means attached to the beam for guiding the carrier means as it is lowered to the work station by the lowerator means; and wherein the lowerator means comprises:

i. base means mounted to the monorail means at the work station;

ii. slide means for reciprocating along the base means;

iii. first actuator means for selectively operating the slide means to contact the carrier means and raise it off the latch means and to lower the carrier means and the workpieces supported thereon to the work station; and iv. second actuator means secured to the base means for selectively contacting the trolley latch means to pivot the latch means between the first and second positions thereof when the first actuator means has raised the carrier means off the latch means to thereby enable the first actuator means to lower the carrier means and the workpieces to the work station.

16. The automatic assembly system of claim 15 further comprising:

a. chain and sprocket means connected between the first actuator means for operating the slide means in response to actuation of the first actuator means;

b. plunger means mounted to the monorail means; and c. third actuator means mounted to the monorail means for operating the plunger means between a first position whereat the plunger means engages the chain and sprocket means to prevent rotation thereof and thereby prevent reciprocation of the slide means and to a second position whereat the plunger means is withdrawn from the chain and sprocket means to permit rotation thereof;

so that uncontrolled reciprocation of the slide means is prevented when the actuator means is in the first position thereof and the plunger means engages the chain and sprocket means.

17. In combination with an automatic monorail system having a framework with a monorail suspended therefrom that defines a path; a trolley that rides along the monorail and stops above a work station located under the monorail path; a carrier supported by the trolley for transporting selected workpieces along the monorail path; and a lowerator mechanism mounted to the framework for removing the carrier from the trolley and lowering the carrier and workpieces supported thereon to the work station, comprising:

a. a plurality of tooling trays indexable in opposite directions parallel to the monorail path and generally aligned vertically thereunder to locate a selected tooling tray at the work station, and to locate non-selected tooling trays remote from the work station, the selected tooling tray receiving and clamping the workpieces supported by the carrier of the stopped trolley and lowered by the lowerator mechanism;

b. an elongated bed generally parallel to and underlying the monorail path;

c. a fixture bidirectionally reciprocable along the bed, the fixture being constructed with the tooling trays; and d. drive means for bidirectionally indexing the fixture to locate the selected tooling tray at the work station and the non-selected tooling trays remote from the work station, so that the selected tooling tray under the stopped trolley receives and clamps the workpieces.

* * * * *